Figure 1:
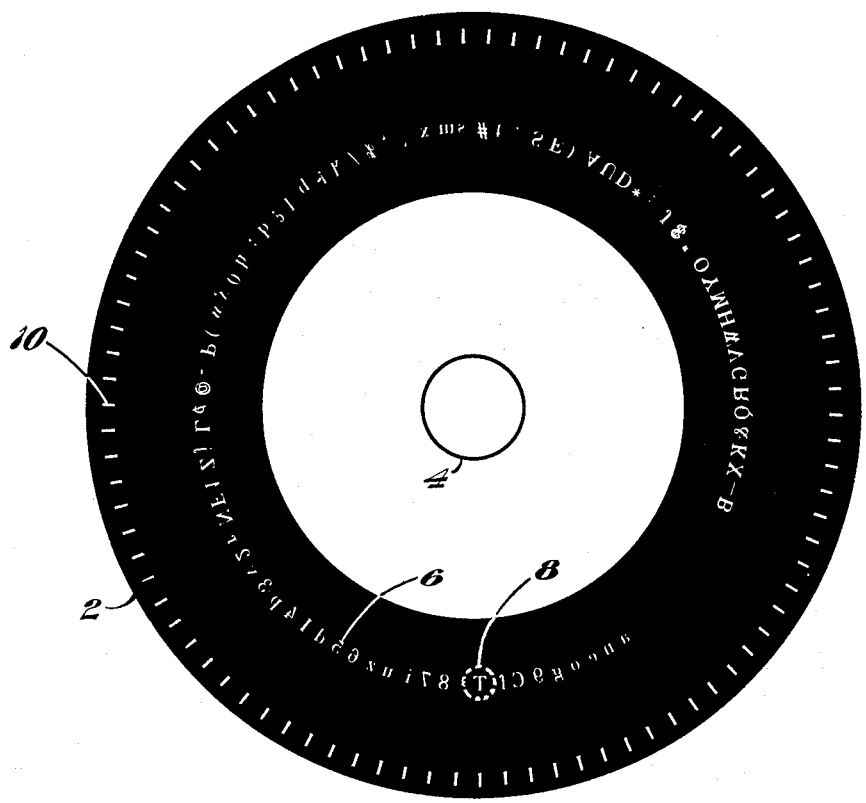

Aug. 23, 1955 L. MOYROUD ET AL 2,715,862
APPARATUS FOR PREPARATION OF CHARACTER MATRICES
AND FOR PHOTOGRAPHIC TYPE PROJECTION
Filed Sept. 20, 1950 5 Sheets-Sheet 1

Inventors
René Higonnet +
Louis Moyroud
By Kenway, Jenney, Witter
& Hildreth, attys.

Aug. 23, 1955  L. MOYROUD ET AL  2,715,862
APPARATUS FOR PREPARATION OF CHARACTER MATRICES
AND FOR PHOTOGRAPHIC TYPE PROJECTION
Filed Sept. 20, 1950  5 Sheets-Sheet 3
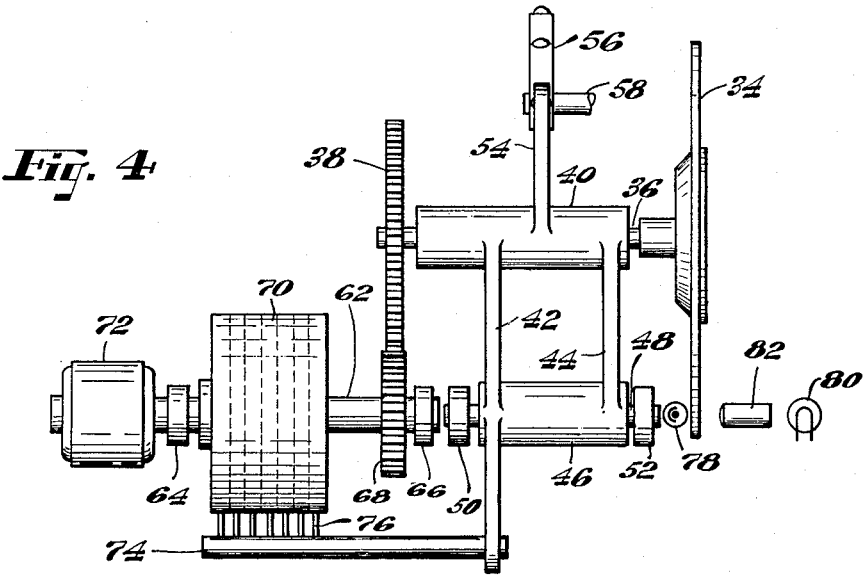
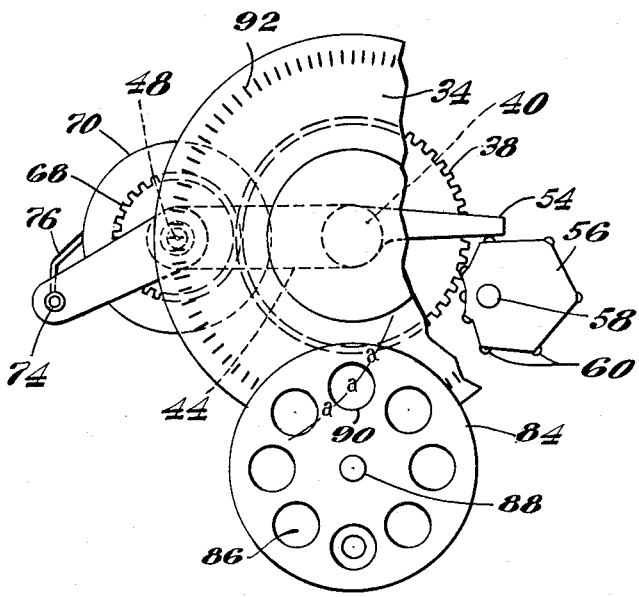
Inventors
René Higonnet &
Louis Moyroud
by Kenway, Jenney, Witter
& Hildreth, attys.

Aug. 23, 1955     L. MOYROUD ET AL     2,715,862
APPARATUS FOR PREPARATION OF CHARACTER MATRICES
AND FOR PHOTOGRAPHIC TYPE PROJECTION
Filed Sept. 20, 1950     5 Sheets-Sheet 4

United States Patent Office 2,715,862
Patented Aug. 23, 1955

2,715,862

APPARATUS FOR PREPARATION OF CHARACTER MATRICES AND FOR PHOTOGRAPHIC TYPE PROJECTION

Louis Moyroud and René Higonnet, Cambridge, Mass., assignors to Graphic Arts Research Foundation, Inc., Cambridge, Mass., a corporation of Delaware Application September 20, 1950, Serial No. 186,652

Claims priority, application Great Britain September 23, 1949

1 Claim. (Cl. 95—4.5)

This invention relates to photographic type composing apparatus, and more particularly to a method for superimposing characters onto an alphabet matrix formed upon an element in the projection apparatus. Detailed descriptions of certain forms of type composing apparatus utilizing character matrices which may be prepared according to this invention are given in our copending applications, Serial No. 770,320, filed August 23, 1947 and Serial No. 150,024, filed March 16, 1950 now Patent No. 2,652,755.

A principal element in any photographic composing apparatus within the purview of this invention is a character carrier (for example, a disk or drum) upon which is formed the above-mentioned matrix, and which co-operates with a rotating mechanism causing the characters disposed on the carrier to move relative to a projection position. Selected characters are projected while in relative motion by an intermittent flash device which is preferably energized on the discharge of a condenser.

In order to cause the flash device to be energized at the precise instant that a selected character is accurately aligned in the projection position, one form of the energizing circuit for the flash device includes a coarse control and a fine control, whereby a flash occurs only on the simultaneous operation of both controls. In this form of the energizing circuit the coarse control is operative during the period that the selected character passes in projection position; the fine control is operative at the precise instant that each and every character passes in projection position and is not adapted to discriminate between the characters. This invention is concerned with fine controls which are carried on the character carrier in precise spatial relation to the characters, as shown, for example, in our application, Serial No. 770,-320, above-mentioned. In this application the precise controls are slits cooperating with a photoelectric cell.

An alternative form of energizing circuit for the flash device includes controls by means of which the coarse control is combined with the fine control as explained in our application Serial No. 150,024, also above-mentioned. In this form the controls are apertures or slits coded with transparent or opaque segments, the controls being carried on the character carrier in precise spatial relation to the characters.

Thus, the present invention involves the formation of character matrices in which the characters are located in fixed spatial relation to precise controls which function to trigger the flash tube. As already indicated these controls may or may not function indiscriminately with respect to the characters, but in either case the precision of the projections can be no greater than the precision with which the characters are located with respect to the corresponding controls. Therefore, a principal object of this invention is to provide a method for constructing character matrices conforming with the character registration requirements of the printing art.

Another object of the invention is to provide a method for producing character matrices which may be readily reproduced by contact printing or otherwise.

Another object is to provide a method for producing character matrices adapted to give precise character registration when changed from one type-composing apparatus to another.

In view of these and other objects, which will hereinafter become more evident, a principal feature of the invention comprises a method for producing character matrices on which the characters and corresponding precise control means are simultaneously disposed in fixed spatial relationship. As shown by the above-mentioned applications, the precision of the flash may be made wholly independent of the spacing between adjacent characters or between adjacent precise control means. When this is true it is only necessary that each character be located in an exact position with respect to some particular precise control means. As hereinafter shown, it is also made possible by another feature of the invention to produce a matrix on which one set of precise control means is used to control the projection of characters of more than one "font." It will be evident that the invention is not limited to photoelectric controls, since the precise control means may be electrostatic, magnetic, mechanical or otherwise.

An important advantage of the invention resides in the fact that the character forms may be of greatly larger scale than the projected images, whereby errors in the projected images, both in respect to shape and position, may be made negligibly small.

These and other features and objects of the invention are hereinafter more fully explained and claimed.

Figure 2:
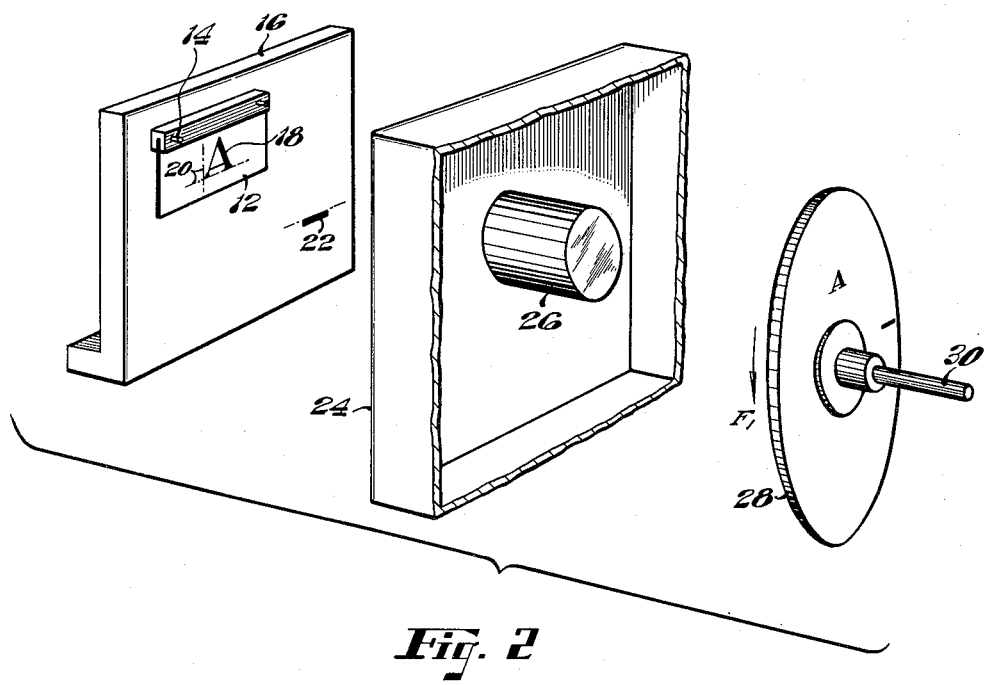
Figure 3:
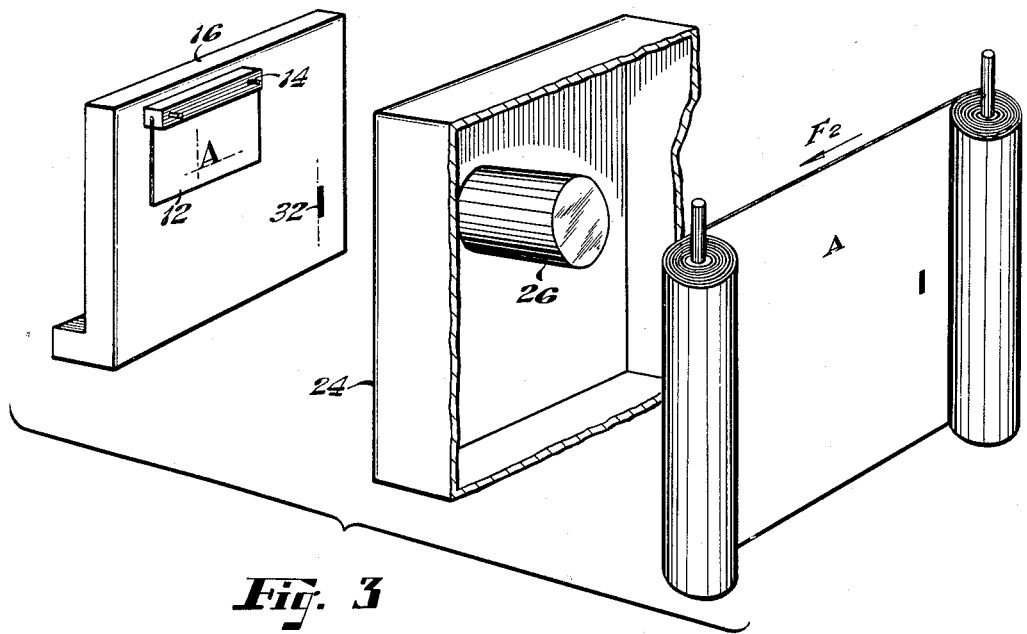
Figure 6:
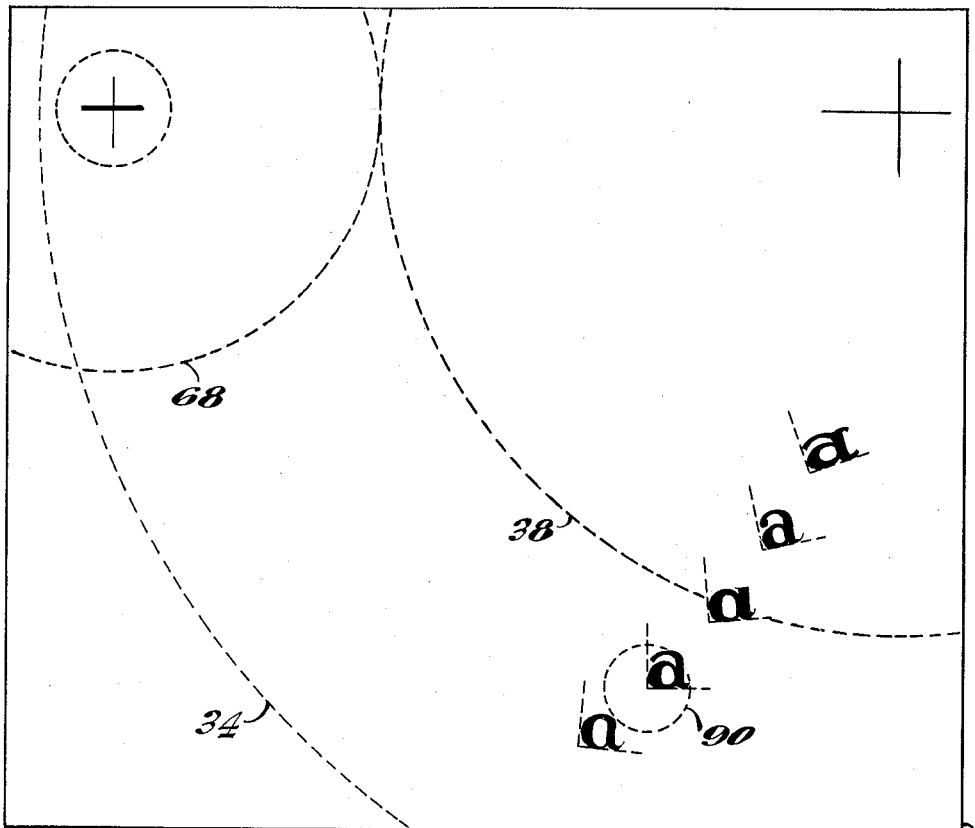
Figure 3A:
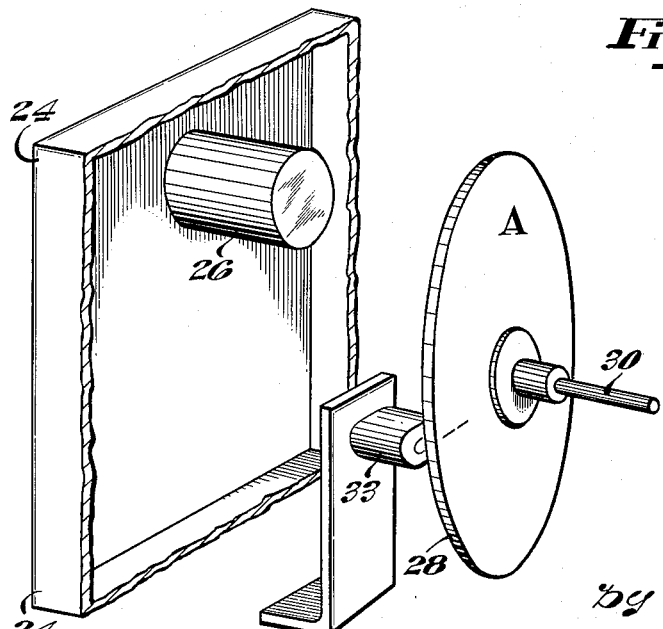
Figure 7:
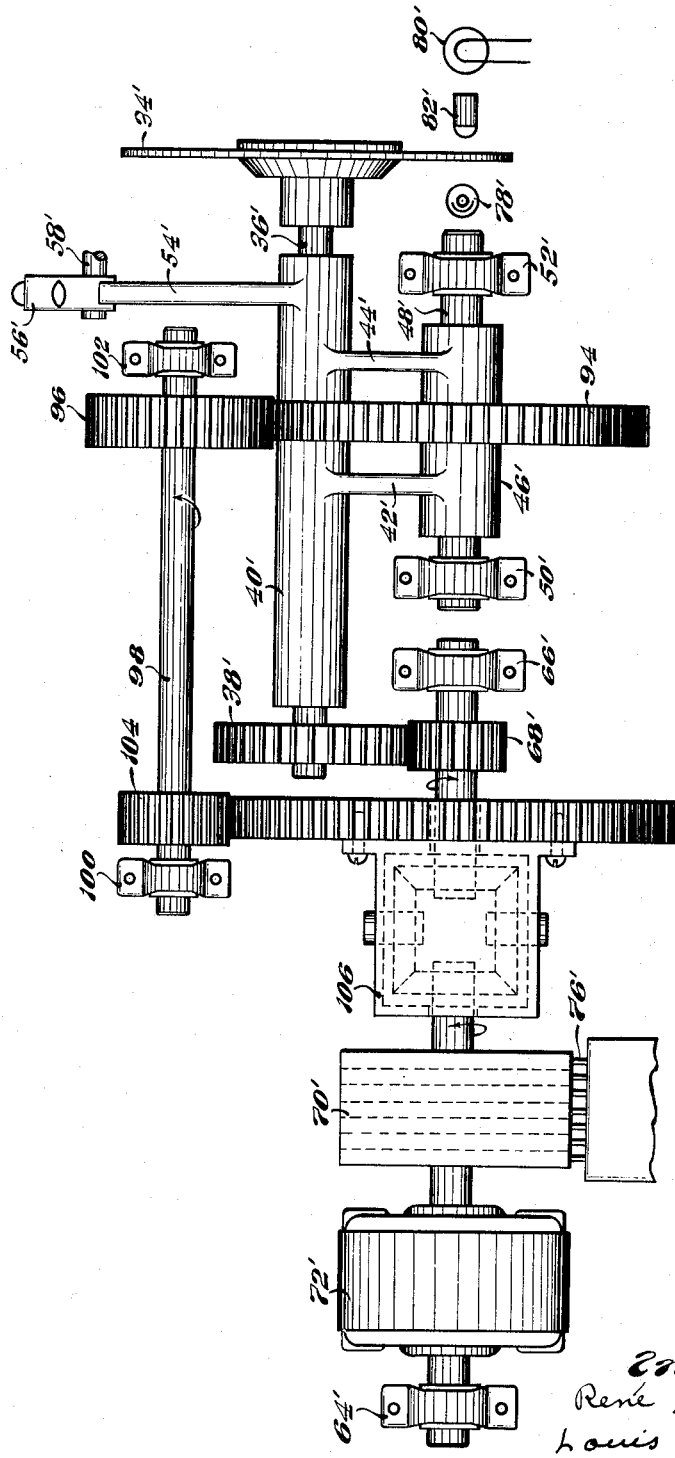

In the drawings, Fig. 1 shows a two-alphabet matrix formed upon a disk; Fig. 2 is a schematic view of a jig for preparation of a matrix upon a disk; Fig. 3 is a schematic view of a jig for preparation of a matrix upon a drum; Fig. 3a shows a registration device for use in the jig of Fig. 2 in place of the aperture form; Fig. 4 is a side view of an alternative form of matrix disk and driving assembly; Fig. 5 is a front view of the assembly shown in Fig. 4; Fig. 6 is a schematic view of a frame for preparation of the matrix used in the assemblies of Figs. 4 and 5; and Fig. 7 is an alternative form of driving assembly for a disk.

A detailed explanation of the operation of apparatus using the disk of Fig. 1 as a matrix support may be found in our copending application Serial No. 770,320, above-mentioned. Briefly, a disk 2 rotates at continuous speed about a fixed axis 4, thereby causing transparent characters such as 6 to pass successively through a projection position represented by dotted lines at 8. At some fixed angle from each character 6 is a corresponding transparent slit 10. This angle may be of any desired size, but every character must bear precisely this same angular relationship to its own slit. It will readily be seen that the number of alphabets or fonts in the circle of characters may be increased or decreased to suit the needs of the composer, the only limitations being dependent upon the sizes of the characters and the diameter of the character circle.

Fig. 2 shows a jig according to the invention which is adapted to form a matrix upon the disk of Fig. 1 by photographic projection of characters and slits. A number of character forms 12 are provided, one for each character to be projected upon the matrix. The forms are provided with holes adapted to register with pegs 14 on a fixed frame 16. The characters 18 are placed upon the forms in such a manner that a reference point in the character, for instance the lower left-hand corner at the intersection of a pair of axes 20, is in a predetermined fixed relationship with the registration pegs 14. The location of this reference point is a function of certain factors which may be summarized as follows: Assuming that the composing machine is adapted to print the characters in the same order that they are stored, if the character is erect on the form, as shown, and is projected by the composing machine before the machine spaces the width of the character, the reference point is at the intersection of the axes 20 as shown in Fig. 2. If the character is inverted and reversed on the form and the projection precedes the spacing the reference point is at the upper right-hand corner of the character. If the character is erect but the width spacing precedes the projection the reference point is at the lower right hand corner of the character. If the character is inverted and reversed on the form and the projection follows the width spacing the reference point is at the upper left-hand corner of the character. For a machine adapted to print in reverse of the order of storage the above summary is correct if the words "left" and "right" are substituted for each other.

A slit or aperture form 22, which is also referred to as a "registration device," is also placed upon the frame 16. This form is a black rectangle which photographs on the matrix as a "slit" 10. The form 22 remains fixed upon the frame for all of the characters 12. One edge of the aperture form, for instance the upper edge as shown in the figure, is also placed in a predetermined fixed relationship with the registration pins 14. The particular edge of the aperture form selected for this is a function of the direction of rotation of the disk 2 during normal composing machine operation. On the assumption that the disk is to rotate in the direction of the arrow at $F_1$ the correct edge for the apparatus of Fig. 2 is the upper edge as shown.

An appropriate light-tight enclosure 24 contains a projection lens and shutter assembly 26 the axis of which passes through the point of intersection of the axes 20. Within the enclosure is mounted a disk or matrix support 28, keyed to a shaft 30 which is rotatable about a fixed axis. The disk is preferably constructed of a rigid material, such as glass upon which a photosensitive film has been prepared.

With the disk 28 held in a fixed position the first character may be projected by operation of the shutter in the assembly 26. Appropriate means such as a ratchet and pawl may be employed to rotate the disk through an angle sufficient to allow necessary clearance between successive projections. The character form 12 is replaced by other forms and the process is repeated until all characters in the matrix have been projected. As shown by our above-cited application, Serial No. 770,320, the negative images on the disk 28 are usable in a photographic composing machine after development without the necessity of making a positive print.

It is to be noted that an exceptional degree of precision is inherent in the preparation of the matrices, since each character and its corresponding slit are photographed in a precise angular relationship. The spacing between successive characters is not required to be precise, and the precision of the matrix is therefore independent of the angle through which the disk is turned in the jig between successive character projections.

It will be apparent that the jig shown in Fig. 2 may also be readily adapted for the preparation of disk-matrices such as those described in our above-cited application, Serial No. 150,024. For this purpose the simple aperture form 22 is replaced with other forms having black and white segments according to the coding of the character with which it is photographed. The precision of the relationship between each character and its fine control is maintained, because of the accurate mounting of the forms.

To adapt the jig for production of matrices having other combinations of opaqueness or transparency of slits and characters, the slit or character forms may be themselves transparent with a source of light behind, or they may be white on a black background.

Fig. 3 shows a jig according to the invention which is adapted to form a matrix upon a drum by photographic projection of characters and slits. A detailed explanation of the operation of apparatus using a drum of this type may be found in our copending application, Serial No. 770,320. Usually, as is there shown, the matrix, when bent over the drum, takes the form of a number of circles of characters, each devoted to a particular font. It is usual to provide a number of circles of slits corresponding to the character circles. The matrix is produced on a film strip or matrix support wrapped over the drum in such a manner as to permit all of the characters of a particular selected circle to move through the projection position in one revolution of the drum, the selection of font being performed by sliding the drum along its axis.

The jig for preparation of the drum matrix is essentially similar to that of Fig. 2, but with a few changes. The aperture form 32 corresponding to the form 22 of Fig. 2 is preferably located with its precision edge aligned vertically instead of horizontally. Assuming that the matrix when wrapped over the drum is to rotate in the direction of the arrow at $F_2$ the precision edge is at the left of the aperture form instead of at the top as in Fig. 2. A matrix formed in the above manner is adapted for motion of the characters in a horizontal rather than a vertical direction through the projection position. It is generally agreed that slight vertical errors in character registration are more likely to be noticed than horizontal errors. Since the direction of rotation corresponds to the dimension in which errors in registration are more likely to occur if at all, the above procedure is preferable. It will be noted that similar provision in the apparatus of Fig. 2 causes any registration errors to appear in the horizontal dimension.

It will again be noted that, as with the jig of Fig. 2, the production of a matrix by the method of Fig. 3 does not depend for its accuracy upon the exactness of the distance through which the matrix is moved between successive character projections.

While only one lens-shutter combination is shown in Figs. 2 and 3, it is equally possible to provide two lenses, one for projection of characters and one for projection of slits or apertures, the only requirement being that both projections must occur without intermediate movement of the forms or matrix support.

As above indicated, the fine controls may be produced by other than photographic means. Where this is done the registration device, which in Figs. 2 and 3 is the aperture form 22 is replaced by a registration device as shown in Fig. 3a, which is also fixed in relation to the character forms, but so located with respect to the matrix support as to permit the creation on the matrix of some discrete, measurable property corresponding in function to the slits shown in the drawings. For example, in Fig. 3a, an electromagnet 33 is shown on a fixed support in position to magnetize areas of a magnetic surface on the disk.

Figs. 4 and 5 show an alternative form of projection apparatus using a disk as the character carrier. This apparatus is designed to permit the use of the disk area for a number of different concentric fonts, which is not possible by the use of disks such as those described in the above-mentioned applications. Referring to Fig. 4, a disk 34 is keyed to a shaft 36 to which is also keyed a gear 38. The shaft 36 is rotatably mounted in a sleeve 40 supported by two arms 42 and 44 and a second sleeve 46 rotatably mounted on a fixed shaft 48. The shaft 48 is supported by two fixed bearings 50 and 52. The above assembly may be rotated about the axis of the shaft 48 by an arm 54 integral with the sleeve 40, the arm cooperating with a cam 56 rotatable to a number of fixed positions about a fixed shaft 58. The exact positions to which the arm is moved are determined by a number of screws 60 set in the faces of the cam (see Fig. 5). To permit the cam to move the arm 54 with great precision the screws 60 are provided with heads which are spherical sectors, the radius of the sphere for each screw being equal to the distance of the particular screw from the axis of rotation of the cam. Thus, slight inaccuracies in cam position do not produce corresponding inaccuracies in the position of the arm.

Coaxial with the shaft 48 is a shaft 62 supported by a pair of fixed bearings 64 and 66. The shaft 62 is keyed to a gear 68, a decoding drum 70 and a motor 72. By a projection on the sleeve 46 an arm 74 supports a number of brushes 76 in contact with the drum 70. The drum 70 is a coarse control comprised of coded areas of insulating and conducting material similar to that described in above-cited application Serial No. 770,320, and there shown in Fig. 32, but it will be readily apparent that any equivalent device, such as a rotating switch cooperating with a set of register operated or keyboard operated relays, may be employed for the coarse control, as shown by our copending application, Serial No. 610,336, filed August 11, 1945.

A photoelectric cell 78 is supported in a fixed position substantially within the axis of the shafts 48 and 62 and receives light through slits in the disk, the source of light comprising a continuous light source 80 and a collecting lens 82.

Referring to Fig. 5, a lens turret 84 supports a number of lens systems 86 and is adapted to rotate about a fixed axis 88 to provide means for changing the size of character projections, or "point size." As in the simpler form of disk already described, each character of a selected font is in projection position when its reference point, defined as above for Fig. 2, coincides with the optical axis of the selected lens. In Fig. 5, for example, the selected lens is shown at 90 and a character "a" is in the projection position.

The characters are arranged on the disk in concentric circles, a different font for each circle. The font of the projected characters is changed by rotation of the cam 56 to bring a different font of characters within the optical axis of the selected lens at the position 90.

Outside the circles of characters is a circle of slits 92, there being as many slits as there are characters in any one circle. When any character passes through the projection position, its corresponding slit is so located as to pass through the axis of the shafts 48 and 62 and to actuate the photoelectric cell 78 at the same moment. At this moment the decoding drum 70 is arranged to be so located with respect to the brushes 76 that the brushes are resting on the sector of the drum corresponding to the character then in the projection position.

It will be noted that the ratio of the gears 68 and 38 is one to two. This is to permit the drum 70 to rotate at twice the speed of the disk 34, since it is convenient to place the lower case of each font in one half of the disk, and the upper case in the other half, with 180 degrees between the upper and lower cases of each character. It will become readily apparent from the description to follow, that other gear ratios and character arrangements may also be used, as desired.

The operation of the above-mentioned apparatus may be described by first assuming that the motor 72 drives the disk 34 at continuous speed and that the selected font is the center font as shown in Fig. 5. It is now desired to project, for example, the lowest font. All projections are therefore discontinued and the cam 56 is rotated to a position which raises the lowest font into position for projection; whereupon projections in the new font are immediately recommenced. The motor 72 rotates continuously and this rotation is not affected by the change of font. Since the circle of slits passes through the center of rotation of the mechanism, the changing of font does not move the slits out of line with the photoelectric cell.

It will be obvious to those familiar with the art that, in order not to upset the relationship between the brushes 76, the drum 70 and the disk 34 when the font is changed, it is necessary to cause the brushes 76 to lead their former positions in a counterclockwise direction by the same angle through which the sleeve 40 is rotated.

It will further be evident that a disk constructed according to the requirements of Figs. 4 and 5 must carry a matrix on which, given the distance between the axis of the shaft 48 and the optical axis of the selected projection lens, the center of each slit is the center of a circular arc of radius equal to this distance containing all characters associated with the same slit. Thus, all the "a's" are on one circular arc corresponding to a single slit, and all the "b's" are on another circular arc corresponding to a different slit.

A feature of the apparatus of Figs. 4 and 5 is that, while the amount of rotation of the sleeve 40 to change the font depends on the differences in the radii of the respective circles of characters, these differences may be made any convenient value without reference to any of the above-mentioned physical relationships. (As hereinafter noted, there are other forms of apparatus within the scope of the invention wherein the differences in radii of the character circles are necessarily related to the angles subtended between adjacent slits.)

Fig. 6 schematically shows a frame 94 for preparation of a matrix for use in the apparatus of Figs. 4 and 5. This frame corresponds to the frame 16 in Fig. 2 and is used in the same jig as shown in Fig. 2. In Fig. 6 the dotted lines show locations of the disk in the jig to receive the character projections and of the gears 38 and 68 relative to the disk when the disk is mounted in the composing machine.

It will be noted that the frame of Fig. 6, when used in place of the frame 16 in Fig. 2, provides a jig which produces a precise character-slit relationship irrespective of the angular displacements between successive slits or between successive arcs of characters belonging to the same slit. Thus, as with all of the jigs heretofore described, it is immaterial as far as accuracy of character registration is concerned whether the disk is accurately rotated in the jig between successive multiple-character projections.

A modified form of the apparatus of Figs. 4 and 5 is shown in Fig. 7. This mechanism is substantially similar to that of Fig. 4, and this is indicated in Fig. 7 by giving to those elements which are similar to elements of Fig. 4 the same numbers which they have in that figure, with a prime.

To the mechanism of Fig. 4 is added a differential gear mechanism comprising a gear 94, rigidly supported by the sleeves 40' and 46' coaxially with the shaft 48', a gear 96 keyed to a shaft 98 rotatable about a fixed axis on a pair of bearings 100 and 102, a gear 104, and a planetary differential gear assembly 106. This assembly is of conventional construction and does not need to be particularly described to those familiar with conventional gearing systems.

By means of this differential gear mechanism a component of the motion of the disk 34' during the period that the mechanism is changing fonts is suppressed. This motion, unsuppressed by the apparatus of Fig. 4, is due to a component of the rolling motion of the gear 38 on the gear 68 which is produced when the font is changed. In order to demonstrate the significance of this rolling action, it may first be assumed, for example, that the disk of Fig. 5 normally rotates in a clockwise direction. Suppose that the lowest or outside font is being projected and that it is desired to project the uppermost or inside font. This requires the lowering of the disk 34. Because of the consequent rolling action of the gears 38 and 68 a sudden acceleration of the disk is thereby created, the direction of which is the same as that in which the disk is rotating. This acceleration will cause several slits to pass through the position to actuate the photoelectric cell before the disk comes to rest and resumes its former continuous rate of rotation. In other words, if a change of font starts when an "a" is in projection position, even though the change of font may be accomplished faster than the time lapse between the passage of the "a" and the "b," the rolling action referred to above prevents the projection of a "b" or a "c" immediately after the change of font, those characters having passed beyond the projection position by the time the change of font has been accomplished. This phenomenon is referred to as the "skipping" of characters. Likewise, the brushes 76 on the decoding drum 70 sweep over a number of coded sectors during the change of font corresponding to the number of "skipped" slits and characters on the disk.

It will be noted that the above consequences follow from an assumption as to the direction as well as the amplitude of the rotation involved in the change of font. It is apparent that a change in the opposite direction, as for example, from the inner to the outer font, does not result in "skipped" characters. It is also apparent that, if there is "skipping," the number of "skipped" characters will depend upon the distance between the two fonts involved.

As will be evident from Fig. 7, a differential gearing may be used to suppress the component of rolling action between the gears 38' and 68' due to the changing of fonts. When this is done the disk 34' does not accelerate as above and no characters are skipped during the change of font. If the time required for this purpose exceeds the time lapse between the passage of successive characters through the projection position, a number of characters will be skipped, but the number is always a constant, regardless of which direction of motion of the disk the change of font requires and also regardless of which two fonts are involved. This results in a saving of time when a font change is required, since characters which would otherwise be "skipped" can be projected immediately after the change of font, rather than nearly a complete revolution of the disk after the change is completed. Note that the bushes 76' are held stationary in Fig. 7.

From the foregoing, it is clear that a matrix prepared according to the above description of Fig. 6 may be used in the mechanism of Fig. 7, since the addition of the differential gearing has no effect upon the distance between a slit and the group of characters with which the slit is associated.

Turning to Figs. 4 and 5, a further consideration of the relationship between the disk and its driving gears reveals that various types of matrices may be carried upon the disk if certain additional conditions and changes are imposed upon the various members. For example, and in order to simplify matters, let it be assumed that the gear 68 in Fig. 5 remains fixed instead of rotating at a fixed speed. If the font is changed to the next outer ring of characters from any initial font the gear 38 will roll counterclockwise around the gear 68. A slit, assumed to be in the position 48 initially, will move out of this position due to the rolling motion. Suppose that a condition is imposed upon the cam 56 and the matrix such that the new font is exactly reached at precisely the same point at which the next succeeding slit reaches the position 48. The matrix is also arranged so that, when the mechanism reaches the new font position, any character, which was initially in projection position, such as the "a" in Fig. 5, again reaches that position in the new font. A number of interesting consequences follow. For example, the mechanism under these conditions will now perform in a manner similar to that of Fig. 7, that is to say, there will be either no "skipping" of characters during the change of font or the number "skipped" will be a constant, and this is true even though there is no differential gearing to suppress the acceleration of the disk during the change of fonts. It will be evident that the brushes 76 must be held stationary as in Fig. 7, however.

Applying conventional mechanism theory to determine the locations of the characters on a matrix conforming to the above conditions, it will be seen that a curve joining the reference points of like characters, such as all the "a's" or all the "b's," is not a circle as in the multi-font matrix disk referred to above. Instead, the curve is on the locus of points on the disk which pass through the projection position during the change of font as above described, assuming that the gear 68 is held stationary. This does not mean, however, that the frame shown in Fig. 6, wherein the characters are arranged in the arc of a circle about the corresponding slit may not be used to prepare the matrix, since, instead of projecting all "a's" or "b's" simultaneously, the characters will be photographed in groups, such as "a, b, c, d," or "k, l, m, n," each group being formed in the arc of a circle on the matrix.

The foregoing description of the method and apparatus for practicing the present invention will suggest numerous possible adaptations thereof to those familiar with the art. In particular, these adaptations should permit maximum utilization of the features heretofore mentioned. For instance, in actual practice the frame 16 (Fig. 2) is large, and the character form 12 and the aperture form 22 are also quite large. The character on a typical form might measure several inches on a side, for example. The images are reduced in projection. Obviously, this greatly reduces the effect on the composed images of any malformation in the character form or any slight inaccuracy in the positioning of the form on the frame. The lens assembly 26, therefore, is much closer to the disk than to the frame 16, although the preferred scale of forms and images is not shown in Fig. 2.

Thus, the function of the frame 16 and the forms mounted on the frame is essentially to provide an object, which, when projected through the lens unit 26 upon the matrix, forms an image having the properties heretofore described, including the property of providing for extremely accurate projection of the character when the matrix is employed in photographic composing apparatus, as described in our copending applications, above cited.

For simplicity of illustration the use of an erecting lens assembly 26 is assumed in the drawings, but it will be obvious that the more usual inverting lens may be used, in which case appropriate changes in the positions of the forms on the frame will be made.

Other adaptations of the invention relate to the various procedural arrangements, which may be embodied in the photographic composing apparatus. As above indicated, the positions of the forms on the frame 16 depend upon the direction of motion of the matrix past the projection apparatus, the order of projection of each character in relation to its own spacing and upon the order of projection of the characters in relation to each other (whether or not the order of projection corresponds to the order in which the characters are stored).

Having thus described our invention, we claim:

A process for preparing a character matrix support for photographic type composition, comprising the steps of mounting the support having a photosensitive layer rotatably about a fixed axis, placing a selected replaceable character form and an aperture form in fixed positions for projection onto the support, said positions being arranged to produce images of the character and aperture at unequal distances from said axis, one edge of the aperture image and the height of the character image being oriented substantially radially to said axis, projecting said images without intermediate movement of the support, rotating the support through a predetermined angle, and repeating the preceding steps with a different character substituted for that previously projected, each character having a base line and one vertical side extremity in the identical positions when photographed as the corresponding lines of the other characters.

References Cited in the file of this patent

UNITED STATES PATENTS

| | | |
|---|---|---|
| 791,062 | Wetmore | May 30, 1905 |
| 1,389,407 | Williams | Aug. 30, 1921 |
| 1,503,595 | Mees | Aug. 5, 1924 |
| 1,808,320 | Schaffer | June 2, 1931 |
| 1,997,435 | Schneider | Apr. 9, 1935 |
| 2,179,617 | Dilks | Nov. 14, 1939 |
| 2,224,497 | McNaney | June 3, 1941 |
| 2,227,987 | Tuttle | Jan. 7, 1941 |
| 2,241,263 | Koppe | May 6, 1941 |
| 2,244,497 | McNarey | June 3, 1941 |
| 2,280,096 | Morrison | Apr. 2, 1942 |
| 2,348,457 | Drehs | May 9, 1944 |
| 2,486,834 | Freund | Nov. 1, 1949 |
| 2,490,338 | Marin et al. | Dec. 6, 1949 |